United States Patent Office 2,729,612
Patented Jan. 3, 1956

2,729,612

ESTERS OF 9,10-DIHYDROXYSTEARIC ACID WITH ETHER ALCOHOLS

Hogan B. Knight and Daniel Swern, Philadelphia, Pa., assignors to the United States of America as represented by the Secretary of Agriculture No Drawing. Application January 13, 1950, Serial No. 138,529

9 Claims. (Cl. 260—31.4)

(Granted under Title 35, U. S. Code (1952), sec. 266)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to esters of 9,10-dihydroxystearic acids and more particularly to the esters of these acids with ether-alcohols. An object of the invention is to provide new compositions of matter and methods for their preparation. Other objects will be apparent from the following description of the invention.

The isomeric 9,10-dihydroxystearic acids, M. P. 95° C. and 130° C., respectively, can be readily prepared in good yield from oleic and elaidic acids. These long chain hydroxyacids have extremely low vapor pressures, they are substantially insoluble in water, and they are stable. These characteristics, coupled with their relatively high oxygen content, suggest possible utility of these compounds as plasticizers. However, the 9,10-dihydroxystearic acids are incompatible with high molecular weight materials, which may be in part due to their high melting points and great tendency to crystallize.

We have found that the esters of 9,10-dihydroxystearic acids with glycol ethers corresponding to the general formulas R—O—CH$_2$—CH$_2$—OH and

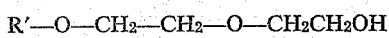

R'—O—CH$_2$—CH$_2$—O—CH$_2$CH$_2$OH wherein R is an alkyl, aryl or aralkyl radical and R' is an alkyl, are odorless, stable, water-insoluble compounds having much lower melting points than the parent acids, and that these esters are compatible with and advantageously modify the properties of many commercially-available polymers.

The esters of this invention are obtained, in substantially quantitative yields, by heating a solution of the 9,10-dihydroxystearic acid in benzene or toluene with the glycol monoether in the presence of an acidic esterification catalyst, such as a naphthalene sulfonic acid, and azeotropically removing the water formed in the esterification process from the reaction mixture. This process is continued until the stoichiometric amount of water has been recovered, after which the ester is isolated by washing the reaction mixture with water and evaporating the organic solvent. The residue so obtained consists of the ester of the 9,10-dihydroxystearic acid. Other inert organic solvents forming water-containing azeotropes may be used in place of benzene or toluene and any acidic esterification catalyst can be used in lieu of the naphthalene sulfonic acid. Usually it is advantageous to utilize an excess of monoether in the process in order to accelerate the esterification rate and to minimize side reactions such as polymerization between the hydroxyl and carboxyl groups of the dihydroxystearic acids.

The following Examples I through XVIII illustrate the preparation of the esters of this invention:

Example I

A mixture of 15.8 g. 9,10-dihydroxystearic acid, M. P. 95° C., 7.6 g. of ethylene glycol monomethyl ether, 0.79 g. of naphthalene-2-sulfonic acid and 200 ml. of toluene was refluxed for eight hours. The water formed during the reaction was removed azeotropically with the toluene and the toluene was returned to the reaction mixture. The reaction mixture was then evaporated to dryness, and the residue washed three times with hot water. The washed product consisting essentially of the low-melting isomer, 9,10-dihydroxystearic acid ester of ethylene glycol methyl ether was obtained in quantitative yield and melted at 44.5°–47° C. Recrystallization from acetone yielded the substantially pure ester M. P. 52.3–53.0° C.; saponification number, 153 (theory 150).

Example II

The high melting isomer, 9,10-dihydroxystearic acid ester of ethylene glycol methyl ether M. P. 80.5°–84.9° C. was prepared as described in Example I, using 9,10-dihydroxystearic acid M. P. 130° C., in place of the low-melting isomer. The substantially pure ester, M. P. 89° C. saponification number 152 was obtained by recrystallization from acetone.

Example III

The low-melting isomer, 9,10-dihydroxystearic acid ester of ethylene glycol ethyl ether was prepared by the procedure described in Example I, using 15.8 g. 9,10-dihydroxystearic acid M. P. 95° C., 9.0 g. ethylene glycol monoethyl ether, 0.79 g. napthalene-2-sulfonic acid and 200 ml. of toluene. Recrystallization from acetone yielded the substantially pure ester, M. P. 48° C.

Example IV

The high melting isomer 9,10-dihydroxystearic acid ester of ethylene glycol ethyl ether was prepared as described in Example III using 9,10-dihydroxystearic acid M. P. 130° C. Recrystallization from acetone yielded substantially the pure ester M. P. 86° C., saponification number 149 (theory 144).

Example V

The low-melting isomer 9,10-dihydroxystearic acid ester of ethylene glycol butyl ether was prepared by the procedure of Example I, using 15.8 g. 9,10-dihydroxystearic acid, M. P. 95° C., 11.8 g. ethylene glycol monobutyl ether, 0.79 g. naphthalene-2-sulfonic acid and 200 ml. toluene. Recrystallization from acetone yielded the substantially pure ester M. P. 52°–53° C., saponification number 136 (theory 135).

Example VI

The high melting isomer 9,10-dihydroxystearic acid ester of ethylene glycol butyl ether was prepared as in Example V using 9,10-dihydroxystearic acid M. P. 130° C. Recrystallization from acetone yielded the substantially pure ester, M. P. 82° C., saponification number 138 (theory 135).

Example VII

The low melting isomer 9,10-dihydroxystearic acid ester of ethylene glycol phenyl ether was prepared by the procedure of Example I, using 31.6 g. 9,10-dihydroxystearic acid M. P. 95° C., 27.6 g. ethylene glycol monophenyl ether, 1.6 g. naphthalene-2-sulfonic acid and 400 cc. toluene. Recrystallization from acetone yielded the substantially pure ester M. P. 79.5° C., saponification number 130 (theory 129).

Example VIII

The high melting isomer 9,10-dihydroxystearic acid ester of ethylene glycol phenyl ether was prepared as in Example VII using 9,10-dihydroxystearic acid M. P. 130° C. Recrystallization from acetone yielded the substantially pure ester M. P. 100° C., saponification number 129.

Example IX

The low melting isomer 9,10-dihydroxystearic acid ester of ethylene glycol benzyl ether was prepared by the procedure of Example I, using 31.6 g. 9,10-dihydroxystearic acid M. P. 95° C., 30.4 g. ethylene glycol monobenzyl ether, 1.6 g. naphthalene-2-sulfonic acid and 400 ml. toluene. Recrystallization from acetone yielded the substantially pure ester M. P. 47° C.

Example X

The high melting isomer 9,10-dihydroxystearic acid ester of ethylene glycol benzyl ether was prepared as in Example IX using 9,10-dihydroxystearic acid M. P. 130° C. Recrystallization from acetone yielded the substantially pure ester, M. P. 81° C.

Example XI

The low melting isomer 9,10-dihydroxystearic acid ester of ethylene glycol 2-ethylbutyl ether was prepared by the procedure of Example I, using 31.6 g. 9,10-dihydroxystearic acid, M. P. 95° C., 29.2 g. of 2-ethylbutyl monoether of ethylene glycol, 1.6 g. of naphthalene 2-sulfonic acid and 400 ml. of toluene. Recrystallization from acetone yielded the substantially pure ester M. P. 31.2°–31.7° C.

Example XII

The high melting isomer 9,10-dihydroxystearic acid ester of ethylene glycol 2-ethylbutyl ether was prepared as in Example XI using 9,10-dihydroxystearic acid M. P. 130° C. Recrystallization from acetone yielded the substantially pure ester, M. P. 81° C., saponification number 131 (theory 126).

Example XIII

The low melting isomer 9,10-dihydroxystearic acid ester of diethylene glycol methyl ether was prepared by the procedure of Example I, using 31.6 g. 9,10-dihydroxystearic acid, M. P. 95° C., 24 g. diethylene glycol monomethyl ether, 1.6 g. naphthalene-2-sulfonic acid and 400 ml. toluene. Recrystallization from acetone yielded the substantially pure ester, M. P. 41.6° C., saponification number 139 (theory 134).

Example XIV

The high-melting isomer 9,10-dihydroxystearic acid ester of diethylene glycol methyl ether was prepared as in Example XIII using 9,10-dihydroxystearic acid M. P. 130° C. Recrystallization from acetone yielded the substantially pure ester, M. P. 83° C., saponification number 138 (theory 134).

Example XV

The low melting isomer 9,10-dihydroxystearic acid ester of diethylene glycol ethyl ether was prepared by the procedure of Example I, using 31.6 g. 9,10-dihydroxystearic acid, M. P. 95° C., 26.8 g. diethylene glycol monoethyl ether, 1.6 g. naphthalene-2-sulfonic acid and 400 ml. toluene. Recrystallization from acetone yielded the substantially pure ester, M. P. 43° C., saponification number 135 (theory 130).

Example XVI

The high melting isomer 9,10-dihydroxystearic acid ester of diethylene glycol ethyl ether was prepared as in Example XV, using 9,10-dihydroxystearic acid, M. P. 130° C. Recrystallization from acetone yielded the substantially pure ester, M. P. 81° C., saponification number 135 (theory 130).

Example XVII

The low melting isomer 9,10-dihydroxystearic acid ester of diethylene glycol butyl ether was prepared by the procedure of Example I, using 31.6 g. 9,10-dihydroxystearic acid, M. P. 95° C., 32.4 g. of diethylene glycol monobutyl ether, 1.6 g. naphthalene-2-sulfonic acid and 400 ml. of toluene. Recrystallization from acetone yielded the substantially pure ester M. P. 43° C.

Example XVIII

The high melting isomer 9,10-dihydroxystearic acid ester of diethylene glycol butyl ether was obtained as in Example XVII using 9,10-dihydroxystearic acid M. P. 130° C. Recrystallization from acetone yielded the substantially pure ester M. P. 79.5° C.

Essentially the same results were obtained by procedures analogous to those described in the foregoing examples using benzene in lieu of toluene, and an equivalent amount of other acidic esterification catalysts such as sulfuric acid, or toluene sulfonic acid in place of naphthalene-2-sulfonic acid.

The following examples illustrate the use of the esters of this invention, as modifying agents for high polymers.

The glycol ether 9,10-dihydroxystearate was dissolved in about 20 ml. of a stock solution of the polymer and the resulting solution was spread onto a 6″ x 8″ glass plate. The solvent was allowed to evaporate slowly and the residual film, after removal from the plate, was examined for compatibility of plasticizer, and by comparison with a similar film containing no plasticizer, it was determined whether the flexibility of the film had been improved by addition of the ester of 9,10-dihydroxystearic acid.

Some of the results so obtained are tabulated as follows:

1. Ethyl cellulose stock solution—
   Ethyl cellulose ———————————————————————— g.. 16
   Xylene: butanol (80:20 by volume) ———————————— ml.. 200

| Plasticizer | Percent by weight of Dry Film | Results |
|---|---|---|
| Each of the products of samples I–VI and IX–XVIII. | 20 | Compatible: flexible films. |

2. Polyvinyl chloride-acetate stock solution—
   Polyvinyl chloride-polyvinyl acetate copolymer (95:5) —— g.. 16
   Butyl acetate: Tetrahydropyran (80:20 by volume) —— ml.. 250

| Plasticizer | Percent by weight of Dry Film | Results |
|---|---|---|
| Each of the products of: | | |
| Examples V and VI | 20 | Compatible: stiff film. |
| Examples IX and X | 20 | Compatible: flexible film. |

3. Polyvinyl butyral stock solution—
   Polyvinyl butyral (high or low viscosity) ———————— g.. 16
   Toluene: Ethanol (80:20 by volume) ————————— ml.. 200

| Plasticizer | Percent by weight of Dry Film | Results |
|---|---|---|
| Each of the products of: Examples V, VI, IX and X. | 20 | Compatible: flexible films. |

Having thus described our invention, we claim:

1. A plasticizer compound of the general formula:

$$CH_3(CH_2)_7-CH-CH-(CH_2)_7-CO-O-R$$
$$\phantom{CH_3(CH_2)_7-}\overset{|}{OH}\phantom{-}\overset{|}{OH}$$

wherein R is a radical of the group consisting of

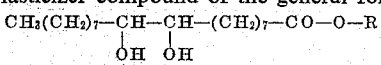

and

wherein R′ is a member of the group consisting of alkyl, phenyl and benzyl hydrocarbon radicals and R" is an alkyl hydrocarbon group.

2. A plasticizer compound of the general formula:

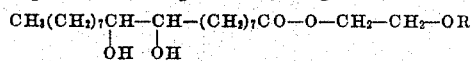

wherein R is an alkyl hydrocarbon radical containing from 1 to 6 carbon atoms.

3. A plasticizer compound of the general formula:

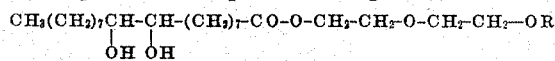

wherein R is a lower alkyl hydrocarbon radical containing from 1 to 4 carbon atoms.

4. A plasticizer compound of the formula:

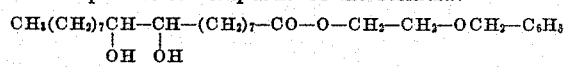

5. A plasticizer compound of the formula:

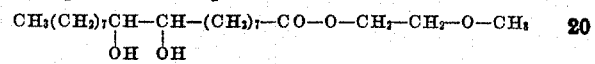

6. A plasticitzer compound of the formula:

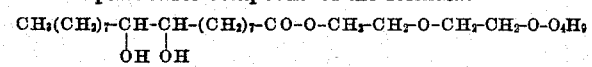

7. A plasticized synthetic resin, the plasticizer being a compound of the general formula recited in claim 1.

8. A plasticized synthetic resin, the plasticizer being the compound of the formula recited in claim 4.

9. A plasticized synthetic resin, the plasticizer being a compound of the formula recited in claim 3.

References Cited in the file of this patent

UNITED STATES PATENTS

| | | |
|---|---|---|
| 1,835,203 | Bruson | Dec. 8, 1931 |
| 2,033,538 | Ralston et al. | Mar. 10, 1936 |
| 2,390,027 | Hunter | Nov. 27, 1945 |
| 2,510,905 | Raczynski | June 6, 1950 |
| 2,562,218 | Smith | July 31, 1951 |